Sept. 3, 1935.                A. WALLACE                 2,013,546
                          ARTICULATED JOINT
                         Filed Nov. 19, 1932

INVENTOR
Allen Wallace
BY
ATTORNEY

Patented Sept. 3, 1935

2,013,546

UNITED STATES PATENT OFFICE 2,013,546

ARTICULATED JOINT

Allen Wallace, Moorestown, N. J.

Application November 19, 1932, Serial No. 643,406

13 Claims. (Cl. 287—89)

This invention relates generally to an improved articulated joint and center pin for railway cars, railroad locomotives or other vehicles, particularly to an improved combination articulated joint and center pin.

In railway rolling stock such as locomotives or cars it is highly desirable that the articulated sections of the car or locomotive shall be maintained in proper operating relation without liability of abnormal stresses or strains being transmitted from one section to another, or of having abnormal stresses imposed upon the articulated joint and center pin. Combined with the desirability of these functions is the necessity of providing structural sturdiness and simplicity together with economical construction of the joint and/or pin without lessening the safety or wearing qualities thereof.

It is one object of my invention to provide an improved articulated joint which will embody the above desirable characteristics and qualities including the ability of allowing the articulated sections to employ the principle of three point suspension in a simple and effective manner, a further object being to provide an improved combined articulated joint and center pin.

Other objects and advantages will be more apparent to those skilled in the art from the following description of the accompanying drawing in which.

Figure 1:
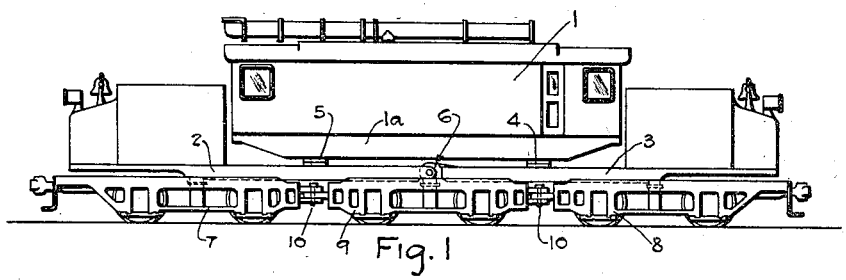
Fig. 1 is a diagrammatic side view of an electric locomotive embodying my improved articulated joint.
Figure 2:
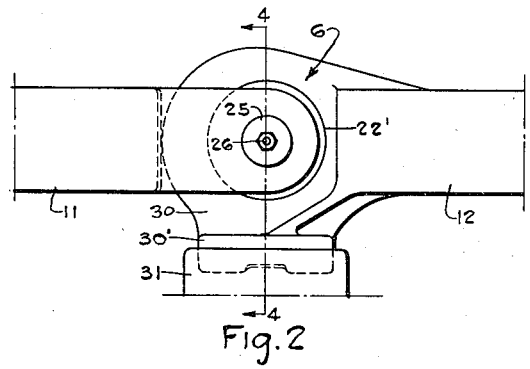
Fig. 2 is a side view of the combined center pin and articulated joint.
Figure 3:
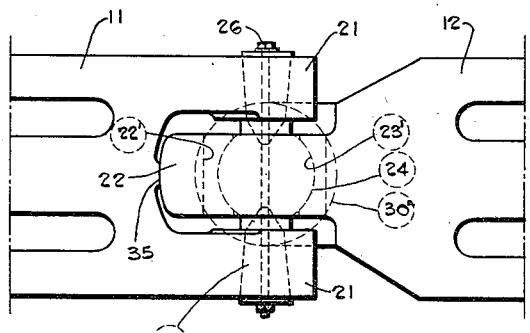
Fig. 3 is a plan view of the mechanism shown in Fig. 2.

While I have illustrated my invention specifically in connection with a locomotive it will be understood of course that the same is applicable to any articulated sections of a multiple unit car or vehicle. As shown herein the cab 1 is mounted on a cab frame 1a which is supported upon a front sub-frame 2 and a rear sub-frame 3. Each sub-frame is connected to the cab frame by center pins located generally at 4 and 5 while the two sub-frames 2 and 3 are connected by my improved articulated joint generally indicated at 6. As shown herein the locomotive is provided with end trucks 7 and 8 and a center truck 9 all of which are relatively closely spaced due to the compactness of the locomotive whereas in connection with other types of vehicles the three trucks may be widely spaced apart due to increased length of the articulated section. Where the trucks are closely assembled as shown herein they may be coupled together by pins 10 although this is not essential.

The sub-frames 2 and 3 are substantially the full width of the locomotive or other vehicles while the inner ends 11 and 12 thereof are reduced to a comparatively narrow width and the two parts are coupled together by the articulated joint 6 above mentioned.

In the present instance the part 11 has two jaws 21 spaced apart for the reception of a tongue 22 on the part 12. This tongue has a cylindrical recess 22' to receive a diametrically split socket member 23 whose two halves form a cylindrical outer surface adapted to have a pressed fit with opening 22' or may, if desired, be keyed in position or held by set screws or other suitable fastening. The socket member 23 has a ball socket recess 23' to receive a ball 24 which is inserted within its socket before the two halves of the socket member are inserted or pressed into cylindrical recess 22'. Engaging this ball are two pins 25 each having a double taper, these pins extending into one degree of tapered openings or recesses in the ball while the pins are mounted in another degree of tapered opening in the jaws 21. These pins are held in position by a bolt 26 extending axially through the pins and a suitable passageway or bore in ball 24. This articulated joint allows horizontal swinging movements, to a limited extent, of both sub-frames 2 and 3 and allows each sub-frame to accommodate itself to any unevenness of the track.

To provide an improved combination of elements which will permit the existence of an effective combined joint and center pin I have caused the tongue 22 to be formed with an integral downwardly projecting neck portion 30 carrying an enlarged cylindrical element 30', the neck and cylindrical portion constituting broadly a pin which is journalled in a cooperating cylindrically recessed center plate 31 carried on the central truck 9. This plate 31 is held in place by a pin 32 extending into an opening in a usual transom of the central truck, and the axis of the center pin as herein specifically shown intersects the ball axis. While the center truck thus supports the inner ends of the sub-frames 2 and 3, the truck is free to accommodate itself to the track.

It will be noted that the recess between jaws 21 is provided with a small boss 35 for engagement with tongue 22 to thus relieve the ball and socket of some end thrust, while ball 24 has small lateral extensions 36 thus providing necessary clearance between the tongue and jaws but at the same time preventing unnecessary looseness between the parts.

Figure 4:
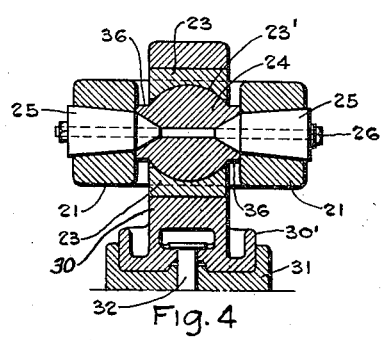
Fig. 4 is a vertical sectional view on the line 4—4 of Fig. 2 and Fig. 5.
Figure 5:
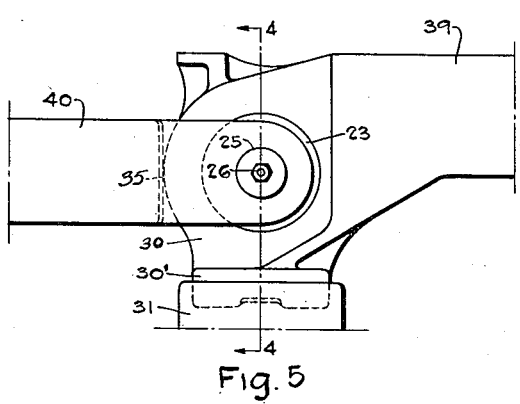
Fig. 5 is a side elevation of a modification wherein the two articulated sections of the vehicles may be vertically offset from each other if desired.

From the foregoing description it is seen that I have provided a relatively simple and yet very effective and economical combined articulated joint and center pin which may be readily adapted for various types of locomotives or vehicles without disrupting the usual designs of such equipment. Where it is desired to have the frame or sub-frame of one section at a higher elevation than the other, then the form of joint shown in Fig. 5 may be employed, it being noted that this differs from the Fig. 4 form by having the tongue project upwardly from the horizontal axis of the ball 24 thus causing a frame 39 to be disposed at a higher elevation than the other frame 40. This type of construction is desirable in certain types of vehicles or cars and shows the manner in which my improved joint may be readily adapted to various conditions.

It will of course be understood that various changes in details of construction and arrangement of parts may be made by those skilled in the art without departing from the spirit of the invention as set forth in the appended claims.

I claim:

1. An articulated joint construction for railway vehicles comprising, in combination, a frame having jaws, another frame having a tongue insertable between said jaws, ball and socket members for connecting said tongue and jaws, and means for directly pivotally supporting said ball and socket about a vertical axis substantially at right angles to the plane of said frames.

2. An articulated joint construction for connecting together the frames of railway vehicles comprising, in combination, a member having jaws, a tongue member insertable between said jaws, means for connecting said tongue and jaws together including a ball socket carried by one of said members, a ball insertable within said socket, means removably insertable through the other of said members for supporting said ball thereby, and means for directly pivotally supporting said ball and socket about a vertical axis substantially at right angles to the plane of said frames.

3. An articulated joint construction for railway vehicles comprising, in combination, two cooperating frame members, ball and socket elements respectively associated with said frame members whereby relatively free movement may be had in a plurality of directions between the same, tapered pins associated with one of said frame members for engagement with said ball; and means for securely holding said pins and ball in normally immovable relation with respect to each other and to one of said frame members.

4. An articulated joint construction for railway vehicles comprising, in combination, two cooperating frame members, ball and socket elements respectively associated with said frame members whereby relatively free movement may be had in a plurality of directions between the same, a double-tapered pin having one of its tapered portions extending through a correspondingly tapered opening in one of said frame members while the other tapered portion of the pin engages a correspondingly tapered opening in said ball; and means for securely holding said pin and ball in normally immovable relation with respect to each other and to one of said frame members.

5. An articulated joint construction for railway vehicles comprising, in combination, two cooperating frame members, ball and socket elements respectively associated with said frame members whereby relatively free movement may be had in a plurality of directions between the same, a double-tapered pin having one of its tapered portions extending through a correspondingly tapered opening in one of said frame members while the other tapered portion of the pin engages a correspondingly tapered opening in said ball, said tapered pins and openings being duplicated on each side of said ball; and means for securely holding said pins and ball in normally immovable relation with respect to each other and to one of said frame members.

6. An articulated joint construction for railway vehicles comprising, in combination, two cooperating frame members, ball and socket elements respectively associated with said frame members whereby relatively free movement may be had in a plurality of directions between the same, a double-tapered pin having one of its tapered portions extending through a correspondingly tapered opening in one of said frame members while the other tapered portion of the pin engages a correspondingly tapered opening in said ball, said tapered pin and openings being duplicated on each side of said ball, and means for positively holding said tapered pins and ball in a normally immovable relation with respect to each other and to one of said frame members.

7. An articulated joint construction for railway vehicles comprising, in combination, two cooperating frame members, ball and socket elements respectively associated with said frame members whereby relatively free movement may be had in a plurality of directions between the same, a double-tapered pin having one of its tapered portions extending through a correspondingly tapered opening in one of said frame members while the other tapered portion of the pin engages a correspondingly tapered opening in said ball, said tapered pins and openings being duplicated on each side of said ball, and a bolt extending axially through said pins and through said ball for holding the same together in a normally immovable relation with respect to each other.

8. The combination set forth in claim 1 further characterized in that said vertical supporting means includes having said tongue provided with a center pin projecting therefrom in a substantially vertical direction.

9. The combination set forth in claim 1 further characterized in that said vertical supporting means includes having said tongue provided with a center pin projecting therefrom in a substantially vertical direction with the axis of the center pin substantially intersecting the axis of the ball.

10. The combination set forth in claim 1 further characterized in that said vertical supporting means includes having said tongue provided with a downwardly projecting integral portion terminating in a cylindrical element, and a cylindrically recessed center plate for receiving said cylindrical element.

11. The combination set forth in claim 2 further characterized in that said vertical supporting means includes having said tongue provided with a downwardly projecting center pin whose axis substantially intersects the axis of said ball and socket.

12. An articulated joint construction for railway vehicles comprising, in combination, two cooperating frame members, ball and socket elements respectively associated with said frame members whereby relatively free movement may be had in a plurality of directions between the same, tapered pins associated with one of said frame members for engagement with said ball, and a center pin projecting downwardly from one of said frame members and having its axis substantially intersect the axis of said ball and socket elements.

13. An articulated joint construction for railway vehicles comprising, in combination, two cooperating frame members, ball and socket elements respectively associated with said frame members whereby relatively free movement may be had in a plurality of directions between the same, a double-tapered pin having one of its tapered portions extending through a correspondingly tapered opening in one of said portions while the other tapered portion of the pin engages a correspondingly tapered opening in said ball, and a center pin projecting downwardly from one of said frame members and having its axis substantially intersect the axis of said ball and socket elements.

ALLEN WALLACE.